(No Model.)
J. H. ASTRUCK.
CAR FENDER.
No. 537,597. Patented Apr. 16, 1895.
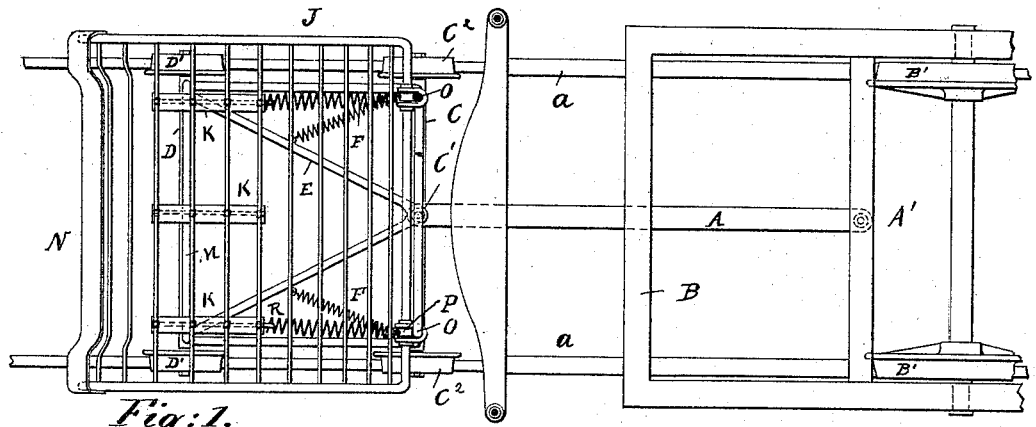
Fig: 1.
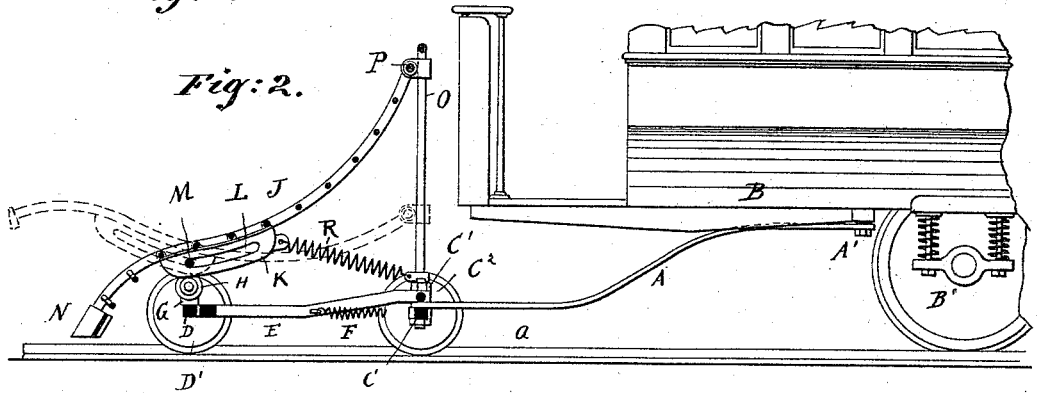
Fig: 2.
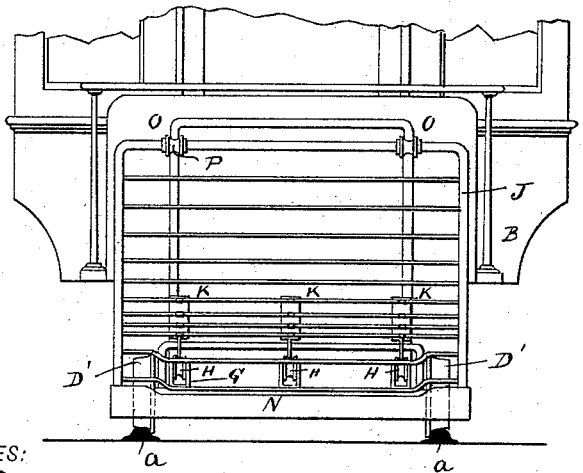
Fig: 3.
WITNESSES:
INVENTOR
J. H. Astruck
BY Sear F. Gunz
ATTORNEY.

UNITED STATES PATENT OFFICE.

JOHN HENRY ASTRUCK, OF NEW YORK, N. Y.

CAR-FENDER.

SPECIFICATION forming part of Letters Patent No. 537,597, dated April 16, 1895.

Application filed March 2, 1895. Serial No. 540,270. (No model.)

*To all whom it may concern:*

Be it known that I, JOHN HENRY ASTRUCK, a citizen of the United States, and a resident of the city of New York, in the county of New York and State of New York, have invented certain new and useful Improvements in Car-Fenders, of which the following is a specification.

The object of my invention is to provide a new and improved fender for cable, trolley, and other motor cars, which is simple in construction, quick and effective in use and at all times in the proper position to catch and hold the person struck by it.

The invention consists in the combination with a car of a support connected with the car and in front of the same, a fender mounted to slide and tilt on said support and having its upper rear end guided to move vertically and a spring for drawing the lower front end of the fender in the direction toward the end of the car.

The invention also consists in the construction and combinations of parts and details as will be fully described and set forth hereinafter and finally pointed out in the claims.

In the accompanying drawings, forming a part of this specification and in which like letters of reference indicate like parts in all the views, Figure 1 is a plan view of my improved fender, part of the bottom frame of the car being also shown in plan view. Fig. 2 is a vertical longitudinal sectional view of my improved fender, part of the car being shown in side elevation. Fig. 3 is a front view of the fender and of part of the car.

A tongue A is pivoted at its inner end to the under side of the car body B at A' and its front end is pivoted at C' to an axle C on the ends of which the wheels C² are loosely mounted to run on the same rails *a* on which the wheels B' of the car run but in advance of the same.

An axle D carries at its ends the two loose wheels D' which also run on the same rails *a* on which the wheels C² and the car wheels B' run and from said axle D, a frame E extends to the rear which is swiveled at C', to the center of the axle C as shown in Figs. 1 and 2, so that at curves in the tracks the axles C and D can assume different inclinations, in regard to the center line of the track rails and in regard to the inclination of the car axles to said center line. Helical springs F or chains connect parts of frame E with the end parts of the axle C for the purpose of holding the axle D normally parallel with the axle C.

In suitable forks or bearings G, on the front axle D, a series of grooved rollers H are mounted, three being shown in the drawings, but more or less may be provided as may be desired.

A curved fender frame J is provided on its under side with as many angle iron track bars K, as there are rollers H, each track bar K resting on a roller H. The several track bars K are arranged in the direction from the front of the fender frame to the rear of the same and each bar K has a longitudinal slightly curved slot L and through the several slots L a rod M passes which is arranged transversely to the fender frame and has its ends fastened on the axle D. Said rod serves for the purpose of preventing the front end of the fender frame from swinging up too far when the rear end is swung down under the action of the weight of a person resting on the fender frame.

The bottom front edge of the fender frame is provided with a buffer attachment N of any approved construction.

The upper rear end of the fender frame is guided to move vertically on rods O extending up vertically from the rear part of the frame E and rollers P are provided on the fender frame which rollers run on said rods O for the purpose of reducing friction.

One or more heavy helical springs R are attached to the front part of the fender frame and have their rear ends fastened to the frame E and serve to draw the lower front part of the fender in the direction toward the front of the car.

Normally the fender frame is in the position shown in Fig. 2.

In case a person is struck by the fender frame the blow causes him to fall upon the same whereby the upper rear part of the fender frame is caused to descend under the action of the weight of said person and at the same time the lower front end of the fender frame slides and tilts and shoots upward and forward into the position shown in dotted lines in Fig. 2, the track plates K running on the rollers H which reduce the friction to a minimum and cause the fender frame to tilt easily and rapidly under the action of the weight of the person. The person is lifted clear of the ground and held in the pocket or cradle formed by the lowered fender frame. As soon as the person is removed from the fender frame the springs R draw said frame back into the normal position.

Having thus described my invention, what I claim as new, and desire to secure by Letters Patent, is—

1. The combination with a car, of a fender located in front of the dash board and having its upper rear end guided to slide vertically, a movable support on which the lower front part of the fender can slide and a spring for drawing the lower front part of the fender in the direction toward the end of the car, substantially as herein shown and described.

2. The combination with a car, of a fender having its upper rear end mounted to move vertically, a movable support connected with the car, on which movable support the lower front part of the fender can tilt and slide and a spring for drawing the lower front part of the fender in the direction toward the car, substantially as herein shown and described.

3. The combination with a car, of a fender having its upper rear end mounted to slide vertically, a movable support for the lower front end of the fender, rollers on said support and track bars on the fender, resting on said rollers and a spring for drawing the lower front end of the fender in the direction toward the end of the car, substantially as herein shown and described.

4. The combination with a car, of a fender having its upper rear end guided to move vertically, a movable support for the lower front end of the fender, rollers on said support slotted track bars on the fender, resting on said rollers and a cross rod passing through the slots of the track bars and having its end fastened to the fender support, substantially as herein shown and described.

5. The combination with a car, of a tongue pivoted to the same, an axle carrying wheels, pivoted to the front end of said tongue, a frame pivoted at its rear end to said axle, an additional axle on the front end of said frame and a sliding and tilting fender on said frame, substantially as herein shown and described.

6. The combination with a car, of a tongue pivoted to the same, an axle pivoted to the front end of said tongue, wheels on said axle, a frame having its rear end pivoted to said axle, an additional axle on the front end of said frame, wheels on said additional axle, flexible connections between the said frame and the axle to which it is pivoted and a sliding and tilting fender on said frame, substantially as herein shown and described.

7. The combination with a car, of a tongue pivoted to the same, an axle pivoted to the front end of said tongue, wheels on said axle, a frame having its rear end pivoted to said axle, an additional axle on the front of said frame, wheels on said additional axle, rollers on said additional axle, a fender having its rear upper end guided to move vertically on supports on said frame, the front lower end of said fender resting on the said rollers and a spring attached to the lower front part of the fender, and to the above mentioned frame, substantially as herein shown and described.

In testimony that I claim the foregoing as my invention I have signed my name, in presence of two witnesses, this 1st day of March, 1895.

JOHN HENRY ASTRUCK.

Witnesses:
OSCAR F. GUNZ,
N. M. FLANNERY.